(12) United States Patent
Dang et al.

(10) Patent No.: US 6,306,970 B1
(45) Date of Patent: Oct. 23, 2001

(54) SOFT PROPYLENE POLYMER BLEND WITH HIGH MELT STRENGTH

(75) Inventors: Vu A. Dang, Bear; Dinshong Dong, Hockessin, both of DE (US)

(73) Assignee: Montell Technology Company BV (NL)

(*) Notice: Subject to any disclaimer, the term of this patent is extended or adjusted under 35 U.S.C. 154(b) by 103 days.

(21) Appl. No.: 09/596,471

(22) Filed: Jun. 19, 2000

Related U.S. Application Data

(62) Division of application No. 09/294,037, filed on Apr. 19, 1999.

(51) Int. Cl.[7] ................................ C08L 25/00; C08F 2/46
(52) U.S. Cl. ......................... 525/197; 522/109; 522/112
(58) Field of Search ............................ 525/197; 522/109, 522/112

(56) References Cited

U.S. PATENT DOCUMENTS

| | | | |
|---|---|---|---|
| 4,916,198 | 4/1990 | Scheve et al. | 526/351 |
| 5,596,052 | 1/1997 | Resconi et al. | 526/127 |
| 5,686,533 | 11/1997 | Gahelitner et al. | 525/240 |

FOREIGN PATENT DOCUMENTS

| | | |
|---|---|---|
| 0634441 | 1/1995 | (EP) . |
| 9623838 | 8/1996 | (WO) . |

*Primary Examiner*—Nathan M. Nutter

(57) ABSTRACT

A polymer blend having a high melt strength and a low Young's modulus after irradiation of the polymers contains (1) a propylene homopolymer or copolymer having an isotactic index of greater than 90 and (2) a propylene homopolymer or copolymer having a crystallinity of <24% made using a metallocene catalyst. The blend can be used for extrusion coating (including fabric coating), foam extrusion, blow molding, and thermoforming applications.

6 Claims, No Drawings

SOFT PROPYLENE POLYMER BLEND WITH HIGH MELT STRENGTH

This application is a division of Ser. No. 09/294,037 filed Apr. 19, 1999.

FIELD OF THE INVENTION

This invention relates to a blend of propylene polymers.

BACKGROUND OF THE INVENTION

High melt strength propylene polymers are known, for example, those described in U.S. Pat. No. 4,916,198. However, these materials tend to be brittle. Various methods have been tried to overcome this problem, such as blending a soft polymer material with a high melt strength polymer material or irradiating a soft polymer starting material, but with limited success. There is still a need for a propylene polymer material that exhibits both high melt strength and softness.

SUMMARY OF THE INVENTION

The composition of this invention comprises a blend of (1) a propylene polymer selected from the group consisting of (a) a propylene homopolymer and (b) a copolymer of propylene and ethylene or a 4–8 C alpha-olefin, wherein the content of polymerized ethylene or polymerized alpha-olefin is 10% or less, the propylene polymer having an isotactic index of greater than 90, and (2) a propylene polymer made using a metallocene catalyst and selected from the group consisting of (a) a propylene homopolymer and (b) a copolymer of propylene and ethylene or a 4–8 C alpha-olefin wherein the content of polymerized ethylene or polymerized alpha-olefin is 10% or less, the propylene polymer having a crystallinity of less than 24% measured from the heat of crystallization. The blend has a melt tension of greater than 7 centiNewtons (cN) at 200° C. and a Young's modulus of less than 1000 MPa.

In another embodiment, an irradiated blend is prepared by (1) preparing a blend comprising (1) and (2) described above, (2) irradiating the blend in an environment in which the active oxygen concentration is established and maintained at less than 15% by volume with high energy ionizing radiation at a radiation dose of 3–12 Mrad, for a period of time sufficient for a substantial amount of radical formation to occur, but insufficient to cause gelation of the material; (3) maintaining the irradiated material in such an environment for a period of up to two hours; and (4) treating the irradiated material while in such an environment to deactivate substantially all of the free radicals present in the irradiated material, whereby the irradiated blend has a melt tension of greater than 7 centiNewtons at 200° C. and a Young's modulus of less than 1000 MPa.

DETAILED DESCRIPTION OF THE INVENTION

Component (1) of the blend of this invention is a propylene polymer selected from the group consisting of (a) a propylene homopolymer and (b) a copolymer of propylene and ethylene or a 4–8 C alpha-olefin, wherein the content of polymerized ethylene or polymerized alpha-olefin is 10% or less. The propylene polymer has an isotactic index greater than 90, preferably greater than 94.

Component (2) of the blend is a propylene polymer made with a metallocene catalyst, selected from the group consisting of (a) a propylene homopolymer and (b) a copolymer of propylene and ethylene or a 4–8 C alpha-olefin wherein the content of polymerized ethylene or polymerized alpha-olefin is 10% or less, the propylene polymer having a crystallinity of less than 24%, measured from the heat of crystallization. An atactic polymer or copolymer, i.e., one having little or no crystallinity, is preferred. Any metallocene catalyst that is capable of producing propylene polymers with the low crystallinity specified above can be used. Such catalysts are well known in the art. One such metallocene catalyst is the reaction product of an organic compound of Ti, Zr, or Hf, e.g., dimethyl- or dibutylsilanediylbis (fluorenyl) zirconium dichloride, and an alumoxane. Preparation of atactic polypropylene and a suitable catalyst are described, for example, in U.S. Pat. No. 5,596,052, which is incorporated herein by reference.

The polymer blend can also contain conventional additives for polyolefins such as, for example, antioxidants, UV light stabilizers, and antacids.

One process for preparing the polymer blend comprises:
(1) preparing a blend comprising:
   (a) a propylene polymer selected from the group consisting of (i) a propylene homopolymer and (ii) a copolymer of propylene and ethylene or a 4–8 C alpha-olefin, wherein the content of polymerized ethylene or polymerized alpha-olefin is 10% or less, the propylene polymer having an isotactic index greater than 90, and
   (b) a propylene polymer made using a metallocene catalyst and selected from the group consisting of (i) a propylene homopolymer and (ii) a copolymer of propylene and ethylene or a 4–8 C alpha-olefin wherein the content of polymerized ethylene or polymerized alpha-olefin is 10% or less, the propylene polymer having a crystallinity of less than 24% measured from the heat of crystallization,
(2) irradiating the blend in an environment in which the active oxygen concentration is established and maintained at less than 15% by volume with high energy ionizing radiation at a radiation dose of 3 to 12 Mrad, preferably 6 to 9 Mrad, for a period of time sufficient for a substantial amount of radical formation to occur, but insufficient to cause gelation of the material;
(3) maintaining the irradiated material in such an environment for a period of up to two hours; and
(4) treating the irradiated material while in such an environment to deactivate substantially all of the free radicals present in the irradiated material, whereby the irradiated blend has a melt tension of greater than 7 centiNewtons at 200° C. and a Young's modulus of less than 1000 MPa.

The polymer blend can be prepared before irradiation by mixing the polymers in solution, mechanically blending the two preformed polymers, or by making the blend in a polymerization reactor by preparing the two polymers sequentially using different catalysts for each component. Alternatively, each component can be irradiated separately and then blended with the other component. Irradiation after blending of the two components is preferred.

The expression "active oxygen" means oxygen in a form that will react with the irradiated material and more particularly the free radicals in the material. The active oxygen content requirement of the process of this invention can be achieved by use of vacuum or by replacing part or all of the air in the environment by an inert gas such as, for example, nitrogen. The active oxygen concentration of the environment is preferably less than 5% by volume, and more preferably less than 1% by volume. The most preferred concentration of active oxygen is about 0.004% by volume.

The term "rad" is usually defined as that quantity of ionizing radiation that results in the absorption of 100 ergs of energy per gram of irradiated material, regardless of the source of radiation. Energy absorption from ionizing radiation is measured by the well known conventional dosimeter, a measuring device in which a strip of fabric containing a radiation sensitive dye is the energy absorption sensing means. The term "rad" means that quantity of ionizing radiation resulting in the absorption of the equivalent of 100 ergs of energy per gram of the fabric of a dosimeter placed at the surface of the propylene polymer being irradiated, whether in the form of a bed or layer of particles, or a film or sheet.

The ionizing radiation can be of any kind, but the most practical kinds are electrons and gamma rays. Electrons beamed from an electron generator are preferred.

The third step of the process is performed in a period of time generally in the range of about one minute to about two hours, and preferably about 2–90 minutes. The final step of the process, which is the free radical deactivation or quenching step, can be performed by the application of heat or by the addition of an additive that functions as a free radical trap, such as, for example, methyl mercaptan.

The process for irradiating the blend of propylene polymers is described in more detail in U.S. Pat. No. 4,916,198, which is incorporated herein by reference.

The irradiated blend or blend of irradiated polymers has a melt tension of greater than 7 cN at 200° C., preferably greater than 12 cN, most preferably greater than 17 cN, and a Young's modulus of less than 1000 MPa, preferably less than 900 MPa, most preferably less than 750 MPa. The amount of each component needed to provide these properties in the final product varies with the radiation dose and with the molecular weight of the starting materials. It is well known in the art that the higher the molecular weight of the starting material, the higher the melt tension will be after irradiation. The choice of the radiation dose and the molecular weight of the starting materials can easily be determined by those skilled in the art. Typically the weight average molecular weight of component (1) will be >260,000 and the number average molecular weight of component (2) will be >75,000.

The blends of this invention are useful in applications such as, for example, extrusion coating (including fabric coating), thermoforming, foam extrusion, and blow molding.

In the following examples, melt tension, which provides an indication of the melt strength of the material, was measured on a Goettfert Rheotens apparatus at 200° C. The Rheotens apparatus consists of two counter-rotating wheels mounted on a sensitive balance beam. A melt strand is extruded from the capillary die and pulled between the rotating wheels until the strand ruptures. The pulling velocity is constant initially to establish a baseline of the force. A constant acceleration is then applied. The maximum force measured during the test is taken as the melt tension. The extensibility of the melt is represented by the velocity at break.

The dynamic shear tests, i.e., low shear velocity, apparent polydispersity, and tanδ, were conducted at 200° C. on a Rheometrics Mechanical Spectrometer, Model 605, with a cone and plate geometry.

The properties of the irradiated blends were measured by the following methods:
Young's modulus ASTM D1708-96
Yield stress ASTM D1708-96
Yield strain ASTM D1708-96
Melt flow rate, 230° C., 2.16 kg ASTM 1238

Molecular weight was determined by gel permeation chromatography.

The percent crystallinity (Xc) can be determined by differential scanning calorimetry according to the equation $Xc=\Delta H/\Delta H°$, where $\Delta H$ is the experimentally observed enthalpy change on melting and $\Delta H°$ is the enthalpy change on melting of 100% of the crystalline material.

Isotactic index is defined as the percent of olefin polymer insoluble in xylene. The weight percent of olefin polymer soluble in xylene at room temperature is determined by dissolving 2.5 g of the polymer in 250 ml of xylene at room temperature in a vessel equipped with a stirrer, and heating at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the isotactic index determined via extraction with boiling n-heptane, which by definition constitutes the isotactic index of the polymer.

In this specification, all parts and percentages are by weight unless otherwise noted.

EXAMPLE 1

This example illustrates the rheological properties of blends of various amounts of isotactic propylene homopolymer (i-PP) made using a Ziegler-Natta catalyst and an atactic propylene homopolymer made using a metallocene catalyst (m-aPP) and of blends of 50% i-PP and 50% m-aPP at various radiation doses.

The m-aPP used in this and the following example was prepared by adding 2.1 l of propylene to a 1 gallon jacketed stainless steel autoclave equipped with a stirrer and a thermocouple connected to a thermostat for temperature control. The reactor was then heated to 50° C. A metallocene catalyst was prepared by dissolving 3 mg of di-n-butyl-silanediyl-bis(9-fluorenyl) $ZrCl_2$ in a solution of methyl alumoxane in isopar (Al/Zr=5000). After 10 minutes of stirring at ambient temperature, the mixture was injected into the reactor at 50° C. The polymerization was carried out at a constant temperature for one hour. Catalyst activity was about 49.1 kg of polymer/gram of catalyst/hour.

The crystallinity of the polymer was too low to measure by DSC. $M_n$ was 110,000.

Xylene (1200–1400 ml), 30 g of i-PP, 12.5 g of the m-aPP prepared as described above, and 0.0425 g of Irganox B225 antioxidant, were added to a 2 liter reaction flask that was equipped with a condenser, a thermometer and a mechanical stirrer. The i-PP had a MFR of 3 g/10 min, an isotactic index of 95.4%, and a $M_w$~700,000 and is commercially available from Montell USA Inc. Irganox B225 antioxidant is a blend of 1 part Irganox 1010 tetrakis[methylene(3,5-di-tert-butyl-4-hydroxyhydrocinnamate)]-methane and 1 part Irgafos 168 tris(2,4-di-t-butylphenyl) phosphite and is commercially available from Ciba Specialty Chemicals Corporation. The mixture was purged with nitrogen for 30 minutes and then heated to 130° C. until all of the polymer dissolved in the xylene. The xylene solution was then poured slowly into cold methanol (−78° C.). White polymer precipitated. The polymer blend was then filtered, washed with cold methanol, and dried in vacuum oven (60° C./10 mm Hg) for 12 hours. The white polymer blend was compression molded into a 40 ml thick film, which was then cut into small strips 1 cm×0.5 cm for irradiation.

The strips were placed in a reaction tube and the tube was purged with nitrogen for 1 hour to ensure that the polymer was under an inert atmosphere for the radiation treatment. After purging, the reaction tube was closed and the polymer blend was irradiated under an electron beam. After irradiation, the tube was placed in an oven set at 80° C. for 1.5 hours and then placed in a second oven at 140° C. for another 1.5 hours. After cooling to room temperature, the polymer blend was ready for evaluation.

The rheological properties of blends containing various amounts of i-PP and m-aPP after irradiation at 6 Mrads are shown in Table 1.

TABLE 1

| i-PP (wt %) | m-aPP (wt. %) | MT (cN) 6 Mrad | VB (cm/sec) | $\eta^*$ @ 0.1 rad/sec (Pa-sec) | App. PI | tan$\delta$ @ 0.1 rad/sec |
|---|---|---|---|---|---|---|
| 100 | 0 | 15.3 | 6.7 | 15840 | 6.05 | 2.01 |
| 85 | 15 | 12.9 | 11.6 | 13680 | 5.37 | 2.16 |
| 75 | 25 | 7.3 | 18.1 | 10010 | 4 | 2.68 |
| 50 | 50 | 14.4 | 6.8 | 17090 | 4.67 | 2.05 |
| 0 | 100 | 18.9 | 2.1 | 19460 | 12 | 1.57 |

The rheological properties of a blend of 50 wt. % iPP and 50 wt. % m-aPP after various doses of radiation are shown in Table 2.

TABLE 2

| i-PP/ m-aPP (50/50) Mrad | MT (cN) | VB (cm/sec) | $\eta^*$ @ 0.1 rad/sec (Pa-sec) | App. PI | tan$\delta$ @ 0.1 rad/sec |
|---|---|---|---|---|---|
| 3 | 9.1 | 13.9 | 25910 | 3.29 | 2.13 |
| 4.5 | 11.8 | 8.9 | 23010 | 4.25 | 1.98 |
| 6 | 14.4 | 6.8 | 17090 | 4.67 | 2.05 |
| 9 | 28.7 | 3.1 | 15850 | 6.36 | 1.87 |

In the tables, MT is the melt tension in centiNewtons (cN), VB is the velocity at break $\eta^*$ the low shear viscosity, App. PI is the apparent polydispersity index, and tan$\delta$=G''/G', where G'' is the loss modulus and G' is the storage modulus. A low tan$\delta$ is an indication of high melt elasticity.

The data in Table 1 show that at a radiation dose of 6 Mrad the melt tension increased as the amount of m-aPP increased when the blend contained 25% or more m-aPP. The data in Table 2 show that for a 50/50 blend of i-PP and m-aPP, the melt tension increased and the low shear viscosity decreased with increasing radiation dose.

EXAMPLE 2

This example shows the tensile properties of two blends of i-PP and m-aPP compared with a high melt strength propylene homopolymer alone.

The high melt strength propylene homopolymer (HMS PP) was made by irradiating the i-PP described in Example 1 at a radiation dose of 9 Mrad in an inert atmosphere, and is commercially available from Montell USA Inc. The i-PP and the m-aPP in the blends were described in Example 1. Both blends were irradiated at a radiation dose of 9 Mrads.

The polymer blend was compression molded into 0.5 mm plaques using the following molding conditions: 4 minutes at 200° C. with no pressure, then 3 minutes at 200° C. at 2000 psig. The plaques were then cooled under ambient conditions for 15 minutes.

Micro-tensile bars were cut using a Dewes-Gumb manual expulsion press equipped with a micro-tensile die according to ASTM D1708-95. The bars were tested on an Instron Model 42202 testing machine according to ASTM D1708-96. The results of the tests are given in Table 3.

TABLE 3

| Melt Tension (cN) | Polymer | Young's Modulus (MPa) | Yield Stress (MPa) | Yield Strain (%) |
|---|---|---|---|---|
| 25 | HMS PP | 1111 | 29 | 8 |
| 30 | i-PP/m-aPP (75/25) | 351 | 13 | 16 |
| 26 | i-PP/m-aPP (50/50) | 86 | 5 | 34 |

The data show that the blends have high melt strength similar to the high melt strength isotactic polypropylene alone, but the blends are much softer, i.e., the Young's modulus is much less.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A process for making an irradiated polymer blend comprising
   (1) preparing a blend comprising:
      (a) a propylene polymer selected from the group consisting of (i) a propylene homopolymer and (ii) a copolymer of propylene and ethylene or a 4–8 C alpha-olefin, wherein the content of polymerized ethylene or polymerized alpha-olefin is 10% or less, the propylene polymer having an isotactic index of greater than 90, and
      (b) a propylene polymer made using a metallocene catalyst and selected from the group consisting of (i) a propylene homopolymer and (ii) a copolymer of propylene and ethylene or a 4–8 C alpha-olefin, wherein the content of polymerized ethylene or polymerized alpha-olefin is 10% or less, the propylene polymer having a crystallinity of less than 24% measured from the heat of crystallization,
   (2) irradiating the blend in an environment in which the active oxygen concentration is established and maintained at less than 15% by volume with high energy ionizing radiation at a radiation dose of 3 to 12 Mrad for a period of time sufficient for a substantial amount of radical formation to occur, but insufficient to cause gelation of the material;
   (3) maintaining the irradiated material in such an environment for a period of up to two hours; and
   (4) treating the irradiated material while in such an environment to deactivate substantially all of the free radicals present in the irradiated material, whereby the irradiated blend has a melt tension of greater than 7 centiNewtons at 200° C. and a Young's modulus of less than 1000 MPa.

2. The process of claim 1 wherein both (a) and (b) in (1) are propylene homopolymers.

3. The process of claim 1 wherein the radiation dose in (2) is about 6 to about 9 Mrads.

4. The process of claim 1 wherein the oxygen concentration is less than 1% by volume.

5. The process of claim 1 wherein the melt tension of the blend is greater than 12 cN at 200° C.

6. The process of claim 1 wherein the Young's modulus of the blend is less than 900 MPa.

* * * * *